F. DEVES.
TRANSMISSION GEARING.
APPLICATION FILED DEC. 28, 1911.

1,093,920.

Patented Apr. 21, 1914.
3 SHEETS—SHEET 1.

Witnesses
D. B. Galt.
H. S. Austin.

Inventor
François Deves.
By Joshua R. H. Potts
Attorney

F. DEVES.
TRANSMISSION GEARING.
APPLICATION FILED DEC. 28, 1911.
1,093,920.
Patented Apr. 21, 1914.
3 SHEETS—SHEET 2.
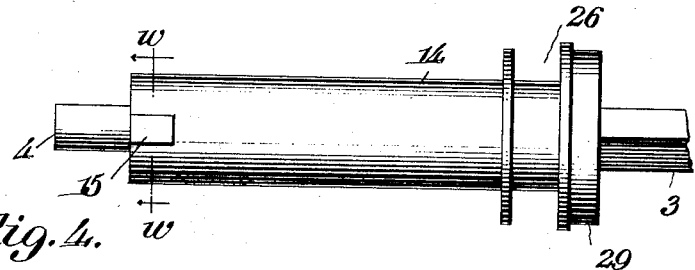
Fig. 4.
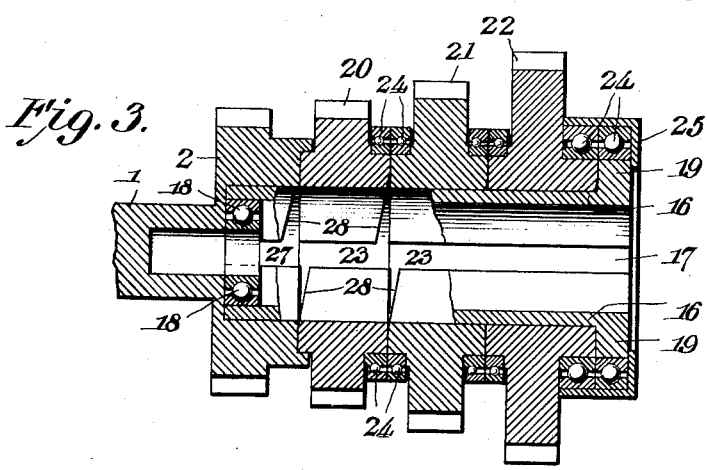
Fig. 3.
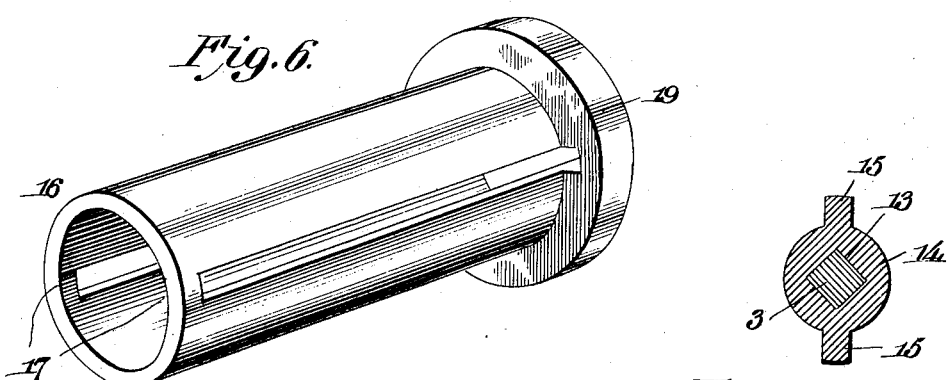
Fig. 6.
Fig. 5.
Witnesses
Inventor
François Deves.
By Joshua R. H. Potts
Attorney

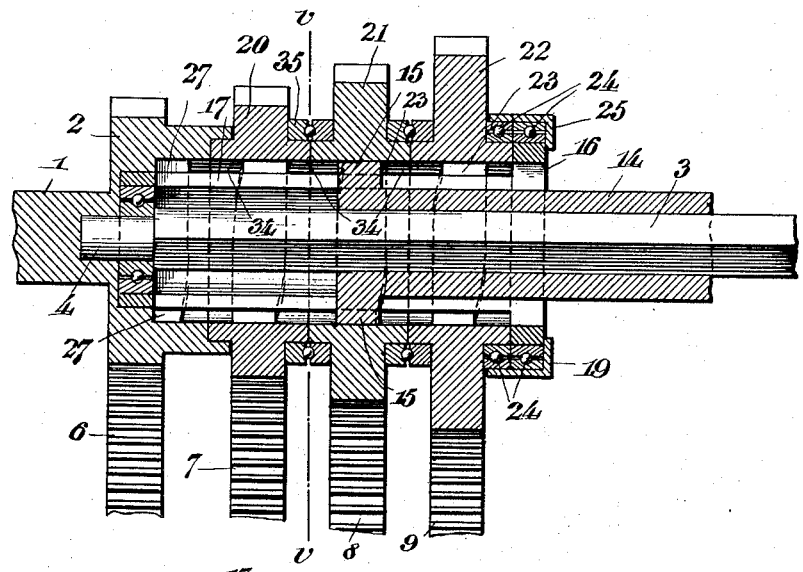
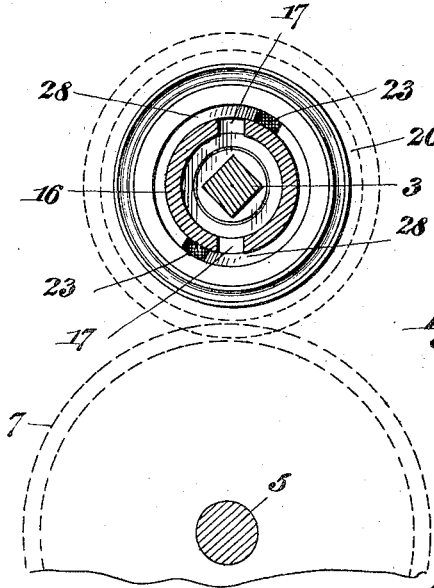

UNITED STATES PATENT OFFICE.

FRANCOIS DEVES, OF NEW YORK, N. Y.

TRANSMISSION-GEARING.

1,093,920.  Specification of Letters Patent.  Patented Apr. 21, 1914.

Application filed December 28, 1911. Serial No. 668,296.

*To all whom it may concern:*

Be it known that I, FRANCOIS DEVES, a citizen of the United States, residing at New York, county of New York, and State of New York, have invented certain new and useful Improvements in Transmission-Gearing, of which the following is a specification.

My invention relates to transmission gearing adapted for use where a work shaft is to be driven at various speeds from a power shaft of constant speed.

The primary object of my invention is to provide a transmission gearing by means of which a number of different speeds may be attained and in which the changes from one speed to another may be accomplished without appreciable shock or jar.

A special object of my invention is to provide a device as mentioned having reverse mechanism and in which the reverse can only be thrown into operation after the work or transmission shaft is brought to the lowest speed and then uncoupled from the positive or forward drive.

A further object of my invention is to provide a device as mentioned in which the change through the several speeds and the reverse is accomplished by one shifting mechanism.

A further object of my invention is to provide a device characterized as above which shall require but little force to shift the mechanism for changing the speeds.

Other objects will appear hereinafter.

My invention will be more readily understood by reference to the accompanying drawings forming a part of this specification and in which—

Figure 1:
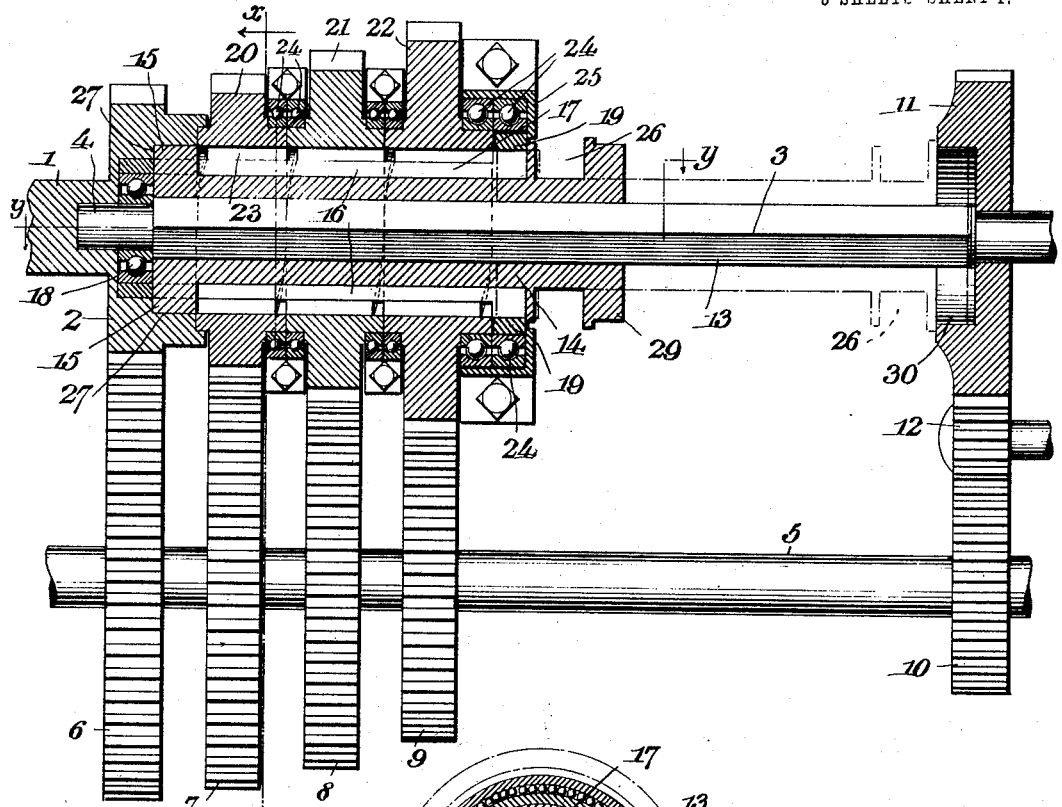
Figure 2:
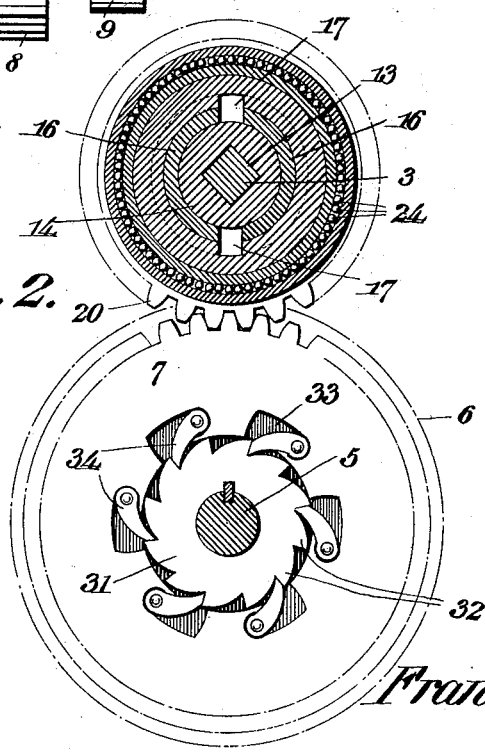

Figure 1 is a longitudinal section through a transmission gearing embodying my invention in its preferred form, Fig. 2 is a transverse section on substantially the line $x$—$x$ of Fig. 1, Fig. 3 is a detail longitudinal section on the line $y$—$y$ of Fig. 1 with the transmission shaft removed and the sleeve partially broken away, Fig. 4 is an elevation of the sliding member, Fig. 5 is a transverse section on the line $w$—$w$ of Fig. 4, Fig. 6 is a perspective view of the two part sleeve upon which the gears on the transmission shaft are mounted, Fig. 7 is a detail longitudinal section of a modified form of the device, and Fig. 8 is a section on the line $v$—$v$ of Fig. 7.

Referring now to the drawings 1 indicates the power shaft which is connected to the motor (not shown) and provided with a fixed gear 2 which may be formed integrally therewith.

3 indicates the transmission shaft which is preferably arranged in alinement with the shaft 1 and in which event it is provided with a journal 4 having bearings in the gear 2 and the shaft 1 as illustrated. Parallel with the shaft 3 is a jack shaft 5 to which are fixed a plurality of gears 6, 7, 8, 9 and 10, the former, that is the gear 6, being in mesh with the gear 2 on the power shaft, whereby the jack shaft is constantly driven at a uniform speed with respect to the power shaft. At a point remote from the gear 2 is a reverse gear 11 loosely mounted on the shaft 3 and connected to the gear 10 by an interposed idler 12. It is obvious that the gear 11 will always rotate in the reverse direction with relation to the direction of rotation of the power shaft 1 and gear 2. Between the journal 4 and the gear 11 the transmission shaft is square in cross section for a purpose which will appear hereinafter.

Mounted upon the squared portion 13 is a sliding member 14 having a square bore to receive the transmission shaft whereby it is rotatably fixed thereto, and provided with radially extending lugs 15 on its periphery at the end adjacent the gear 2. The outer surface of the member 14 is preferably cylindrical and upon the same is mounted a sleeve 16 having longitudinal slots or channels 17 to permit free passage of the lugs 15. The lugs 15 are of greater length than the thickness of the walls of the sleeve 16 so as to project beyond the periphery thereof. One end of the sleeve 16 is journaled within the gear 2, spacing bearings 18 being provided between the inner end thereof and the journal 4 of the transmission shaft. The opposite end of said sleeve is provided with an outwardly extending peripheral flange 19.

Loosely mounted upon the sleeve 16 are a plurality of gears 20, 21 and 22 which are in mesh with the gears 7, 8 and 9 respectively on the jack shaft. The hubs of the gears 20, 21 and 22 are extended laterally beyond the side faces of the gears and fit snugly between the gear 2 and the flange 19, the adjacent ends of said hubs abutting each other as shown clearly in Figs. 1, 3 and 7. Extending through the hubs of said gears are recesses 23 adapted to register at times with the channels 17 and to receive the lugs 15 as the member 14 is shifted to couple said gears to the transmission shaft. The several gears are of different sizes and it is obvious that the speed of the transmission shaft may be varied by shifting the member 14 to lock the successive gears to the shaft.

In Figs. 1, 2 and 3 24 indicates ball bearing supports for the hubs of the several gears and the flange 19, and 25 indicates a flange or member on one of the supports for engaging the outer edge of the flanges 19 to prevent longitudinal shifting of the members 16 and the gears 20, 21 and 22 as the member 14 is moved.

26 indicates a peripheral groove on the member 14 to receive suitable shifting mechanism which is not shown as it may be of any ordinary or preferred construction, and will be obvious to anyone skilled in the art.

The gear 2 is provided with recesses 27 to receive the lugs 15 whereby the transmission shaft may be coupled directly to the power shaft for the highest speed, and the gears are so arranged that the speed will be decreased as the member 14 is moved away from the gear 2. To facilitate the entrance of the lugs 15 into the recesses 23 the faces of the hubs are provided with helical inclines 28.

The opposite end of the member 14 from that upon which the lugs 15 are formed, is provided with a clutch member 29 adapted, when the member 14 is moved to its limit to engage a corresponding clutch portion 30 in the reverse gear 11. The gear 11 is spaced a sufficient distance from the gear 22 so that the lugs 15 are disengaged from the gear 22 before the clutch members 29 and 30 coöperate, by which construction the transmission shaft is first brought to lowest direct driving speed before being uncoupled and thrown into clutch with the gear 11.

As the lugs 15 pass from gear to gear, in changing the speed, there are times in the form illustrated in Figs. 1 to 3, when they will lock two adjacent gears to the transmission shaft. As these gears normally rotate at different speeds it is obvious that the gears on the jack shaft, with which they mesh, cannot be rigidly fixed thereto, as under such conditions either the gears would be stripped, or the engine stopped or injured. Accordingly I provide a connection, between the jack shaft and the gears thereon, whereby the positively driven jack shaft will normally communicate a positive rotation to the gears at a fixed and uniform speed, but which will permit either of the gears to run more rapidly than the shaft and remaining gears whenever required. I do not limit myself to any particular construction of this part of the device, but find that shown in the drawing to be sufficient. As shown therein, a series of wheels 31 are securely fixed to the jack shaft 5, and upon these are loosely mounted the gears 7, 8 and 9 and a ratchet connection is provided between said wheels 31 and the respective gears thereon. The peripheries of the wheels 31 form bearings for the gears except where they are formed with the ratchet teeth 32. The gears 7, 8 and 9 are provided with recesses or pockets 33 in which are mounted dogs 34 which engage the ratchet teeth 32.

If preferred, the gears 6, 7, 8 and 9 may be secured rigidly and directly to the jack shaft 5 but in this case, the ends of the hubs of the gears 20, 21 and 22 are recessed at their ends sufficiently to together provide annular spaces of ample size to accommodate the lugs 15 without the same being engaged with either gear. This form is shown in Figs. 7 and 8, 34 indicating the annular spaces mentioned. In other respects this form is substantially the same as that first described.

35 indicates ball bearings interposed between the gears to relieve the friction between the adjacent hub ends.

It is obvious that with the mechanism above described the speed of the transmission shaft may be varied without appreciable shock or jar and that the various speeds and the reverse may be obtained by means of one shifting member. The device is compact, will occupy but little space, is simple of construction and will not readily get out of order. Furthermore, it is impossible for the device to be broken through the shifting of the member 14 as the depth of the helical portions 28 is equal to the length of the lugs 15 by which construction it is impossible for the member 14 to be positively locked to any two of the gears at the same time.

Having described my invention what I claim as new and desire to secure by Letters Patent is:—

In a transmission gearing a power shaft, a transmission shaft in alinement therewith and having one end journaled in the end of said power shaft, a jack shaft parallel with the first said shafts, a member slidably mounted on said transmission shaft and fixed against relative rotation thereon, a sleeve surrounding said sliding member, said sleeve comprising two similar halves and spacing portions connecting the same at the ends thereof and forming longitudinal grooves between said halves, spacing bearings interposed between the end of said sleeve adjacent said power shaft and the adjacent portion of the transmission shaft, there being lugs on said sliding member extending through said grooves, the opposite end of said sleeve being formed with an outwardly turned flange, an abutment for said flange, a pinion on the end of said power shaft, a plurality of gears loosely mounted on said sleeve between said pinion and said flange and provided with key ways for coöperation with the said lugs on said sliding member, the said pinion and flange forming abutments for said gears, a gear fixed to said jack shaft and meshing with said pinion and a plurality of gears on said jack shaft meshing with the gears on said sleeve, there being a ratchet connection between each of said plurality of gears on said jack shaft and said shaft, substantially as described.

In testimony whereof I have signed my name to this specification in the presence of two subscribing witnesses.

FRANCOIS DEVES.

Witnesses:
JAMES W. KENNEDY,
GEORGE J. BENNER.